FIG. I

INVENTORS
FREDY SCHEUCHZER &
ANDRE SCHEUCHZER
BY
ATTORNEY

Dec. 1, 1959   F. SCHEUCHZER ET AL   2,914,867
TRACK BALLAST MACHINE
Filed Aug. 4, 1954   13 Sheets-Sheet 2

FIG. 2

INVENTORS
FREDY SCHEUCHZER &
ANDRE SCHEUCHZER
BY
Robert E. Burns
ATTORNEY

INVENTORS
FREDY SCHEUCHZER &
ANDRE SCHEUCHZER

Dec. 1, 1959    F. SCHEUCHZER ET AL    2,914,867
TRACK BALLAST MACHINE
Filed Aug. 4, 1954    13 Sheets-Sheet 7

FIG. 6

INVENTORS
FREDY SCHEUCHZER &
ANDRE SCHEUCHZER
BY
ATTORNEY

Dec. 1, 1959  F. SCHEUCHZER ET AL  2,914,867
TRACK BALLAST MACHINE
Filed Aug. 4, 1954  13 Sheets-Sheet 8

FIG. 6a

INVENTORS
FREDY SCHEUCHZER &
ANDRE SCHEUCHZER
BY
Robert E. Burns
ATTORNEY

Dec. 1, 1959  F. SCHEUCHZER ET AL  2,914,867
TRACK BALLAST MACHINE
Filed Aug. 4, 1954  13 Sheets-Sheet 9

FIG. 7

INVENTORS
FREDY SCHEUCHZER&
ANDRE SCHEUCHZER
BY
ATTORNEY

Dec. 1, 1959   F. SCHEUCHZER ET AL   2,914,867
TRACK BALLAST MACHINE

Filed Aug. 4, 1954   13 Sheets-Sheet 12

INVENTORS
FREDY SCHEUCHZER &
ANDRE SCHEUCHZER
BY
*Robert E. Burns*
ATTORNEY

INVENTORS
FREDY SCHEUCHZER &
ANDRE SCHEUCHZER 2,914,867
Patented Dec. 1, 1959

United States Patent Office

2,914,867
TRACK BALLAST MACHINE

Fredy Scheuchzer and André Scheuchzer,
Lausanne, Switzerland

Application August 4, 1954, Serial No. 447,842

Claims priority, application Switzerland
August 10, 1953

18 Claims. (Cl. 37—104)

The present invention relates to a machine for clearing ballast associated with railroad tracks.

It is an object of the invention to provide a machine which can be moved along railroad tracks and which will automatically clear the tracks of their ballast as it progresses along the tracks.

In accordance with the invention there is provided a machine of the character indicated which comprises a frame in the form of a complex beam mounted on wheels for locomotion on the tracks, an excavating chain which, in working position, describes a closed polygonal path, a section of which passes under the ties of the tracks and two lateral section of which extend from there upward, embracing the frame, and driving and transmission means for effecting the desired locomotion and for moving the excavating chain.

Illustrative embodiments of the invention are shown, by way of example only, in the accompanying drawings, wherein.

Fig. 8 is a similar view taken approximately along the line VIII—VIII in Figs. 5 and 5a;

Referring to the drawings, the embodiment illustrated comprises a frame 2 in the form of a complex beam mounted on wheels 3 for movement over rails 4 of a track to be cleared. The ties 6 rest forwardly of the machine on previously laid ballast B, and rearwardly of the machine on ballast B' which has been screened in the machine by known means diagrammatically indicated in Fig. 1. The excavating chain 5 is fully mounted between the axles 3a and 3b of the front and rear wheels. In its working position shown in Fig. 1 it describes a closed polygonal path, a lower section of which, defined by a guide 16, passes under the ties 6. Two lateral sections, defined by guides 14 and 15, extend obliquely backward from the guide 16 and upward to a point above the beam 2. The guide 14 is on the ascending side of the chain and forms a channel for the elevation of the ballast. The guides 14 and 15, as well as two wheels 7 and 7' at which they terminate, are supported by a movable frame work 11. A casing 8, also supported by frame work 11, contains transmission elements connecting wheel 7 with a motor 7a. The machine is also equipped with driving and transmission means indicated diagrammatically at 3a' for moving it over the rails.

The framework 11 is mounted in the center of a crosspiece 2d of the beam 2 by means of a swivel joint 12 with which it is integral and a bearing 13 for swivel joint 12, the center of which is in the longitudinal plane of symmetry P of the track, perpendicular to the plane of the rails. This plane is the plane of symmetry for the beam 2 as well as for the framework 11 when it is in its median position shown in Figs. 1 and 2.

Figure 2:
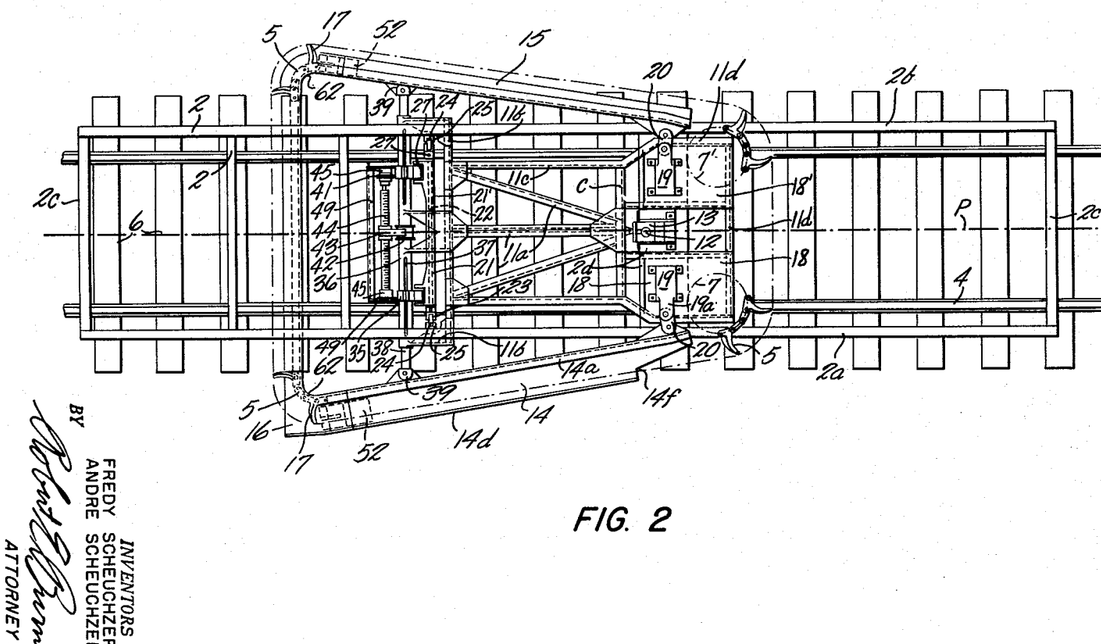
Fig. 2 is a top plan view of a portion of the machine shown in Fig. 1 as seen approximately in the direction of the arrows II—II.

The framework is formed from bars which define frames in different planes and of different widths. These frames are connected together at the sides which they have in common and which are perpendicular to the plane P in the median position of the framework. One of these frames, designated 11a, has the general form of an isosceles triangle, at the vertex of which is fastened the swivel joint 12. This frame extends downward obliquely between the two stringers 2a and 2b of beam 2 and to a point below these stringers where its lower side extends on both sides to a point outside the projection of the stringers drawn perpendicularly to the plane of the rail. This prolonged side forms one of the sides of a rectangular frame, the smaller sides of which, perpendicular thereto, are directed forwardly, where they are joined by a tube 36 closing the rectangle of frame 11b. The prolonged lower side of the triangular frame 11a is common to frame 11b and to a rectangular frame 11c which extends opposite frame 11b and which is comprised between the two stringers of beam 2. The two lateral sides of frame 11c define a middle plane which forms an acute angle with that of frame 11a. They are joined at their upper ends by a bar C, the center of which is fastened to the apex of the triangular frame 11a and the two halves of which form between them an obtuse angle so that ends of the halves meet the plane of the two lateral sides. Bar C is also part of a partly rectangular and partly trapezoidal frame 11d. Bar C forms the lower side of frame 11d while the middle plane of the lateral sides of frame 11d is at an acute angle with respect to that of the lateral sides of frame 11c. Frame 11d extends obliquely upwardly and backwardly from bar C and supports the casing 8 and the wheels 7 and 7' of the chain 5, on platforms 18 and 18' (Fig. 2).

The bearing 13 of the swivel joint 12 is secured to a crosspiece 2d of beam 2. At its lower end the framework 11 is supported by a frame 49 which is suspended from the beam 2 by means described below and shown more particularly in Figs. 5, 5a, 6, 6a and 7. This frame comprises a three-sided chassis, of which two sides 45, which are parallel to the direction of the track in the position shown in Fig. 2, are rigidly integral with two sleeves 35 in which is slidable the tube 36 of the framework 11. The tube 36 is provided with outer keys 37 engaged in internal grooves of sleeves 35.

Top pieces 2e of the stringers 2a and 2b are joined by a crosspiece 2f on which are symmetrically mounted two casings 28, each of which contains a motor (not shown), a tangential screw 29 connected to the motor, and a helicoidal wheel 30 meshing with screw 29. Wheel 30 is connected with two barrels 31 rotatable in bearings 32. The unit formed from parts 30—31 is internally threaded and constitutes an axially fixed nut mounted on a screw 27, the screw being forced to rise or descend when the nut turns in one direction or in the other. These movements are brought about by means of the controls for the two motors which are of a reversible type.

The two screws 27 support, respectively, the two ends of a shaft 22 which they embrace by heads 26 in which the ends are articulated about axes parallel to the stringers 2a and 2b. Through the intermediary of shaft 22, the screws 27 support two symmetrical connecting rods 21 and 21' having long articulation sleeves 21a and 21a' which are carried by shaft 22 between the two heads 26. The opposite ends of connecting rods 21 and 21' support the frame 49 by means of parts 34 which are adapted to rotate and oscillate in relation to the sleeves 35 which they support by laterally projecting portions carried by the sleeves, which support the tube 36 of the framework 11.

At its two ends the shaft 22 has heads 23 in which are mounted rollers 24 engaged in guide-ways 25 which are secured vertically against the inner faces of the stringers 2a and 2b. These guide-ways consist of U-shaped irons the flanges of which are long enough that they always embrace the peripheral edges of the rollers 24 when the screws 27 give the shaft 22 a few degrees of inclination which would bring about similar inclination of the lower and transverse path of the chain 5 relatively to the plane of the two rails. Barrels 33 protect the upper portions of the screws 27 when in raised position.

The connection of the screws 27 to the shaft 22 and the vertical guiding of this shaft prevents the screws from being rotated by friction in the nut units 30—31.

The lateral sides 45 of the frame 49 serve as bearings for pivots which receive the ends of a screw 44 mounted between them parallel to the tube 36 and centered with respect to it as shown in Fig. 2. Near one of its ends, screw 44 carries a toothed wheel 41 which receives a chain 47 (Fig. 7) connected with the shaft of a speed reducer 46 combined with a motor 48 which are disposed on a pedestal 51 secured to frame 49. A ring 42 secured to tube 36 has a circular groove in which are engaged the two branches of a fork 43a which carries a nut 43 threaded on the screw 44.

The bottom of the groove in ring 42 prevents the fork and the nut from turning when the screw 44 is rotated in one direction or the other by the motor 48, so that the nut is propelled to the right or to the left of the track and so that its fork then drives the tube 36 of the framework 11 in one direction or the other by pushing against one of the flanks of the groove, whereby all points of the framework 11 are made to turn about the center of the swivel joint 12, in parallel planes defined by the positions of the screws 27.

Through each of the ends of the tube 36 there is introduced a bar 38 which is free to slide in its respective half of the tube to occupy therein several positions determined by a series of holes 38a into which a pin 40, which passes through suitable apertures in the tube 36, may be introduced to immobilize the bar in one another of these positions. The outer ends of bars 38 carry articulation means 39 for the lower portions of the lateral guides 14 and 15 (Fig. 2).

Figure 1:
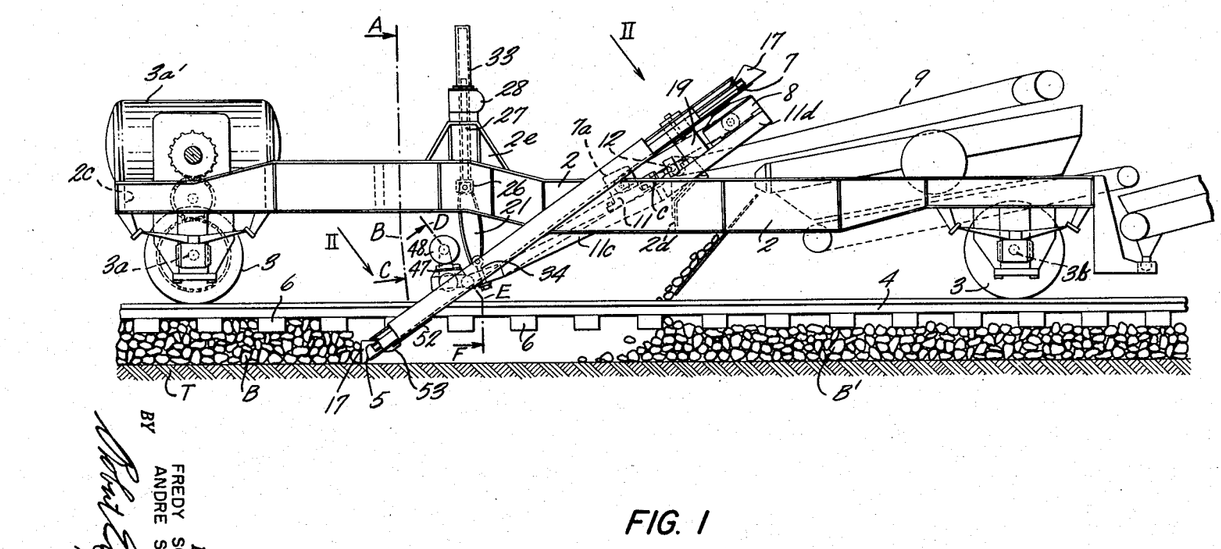
Fig. 1 is a side elevational view of a machine embodying features of the present invention.
Figure 10:
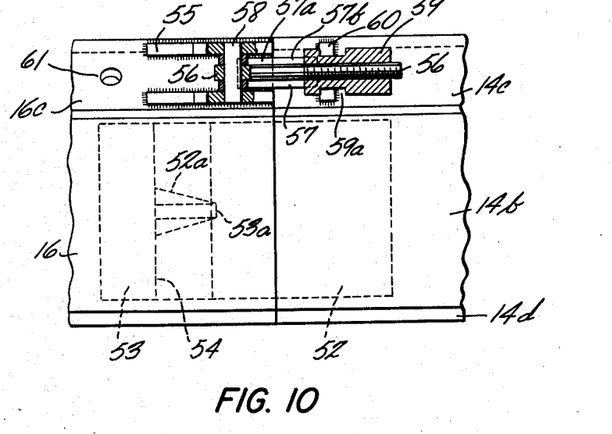
Fig. 10 is a view on an enlarged scale of a detail of the structure shown in Fig. 2.
Figure 11:
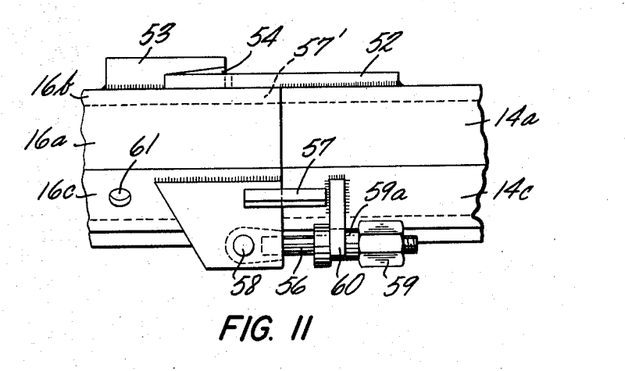
Fig. 11 is a top view of Fig. 10.
Figure 12:
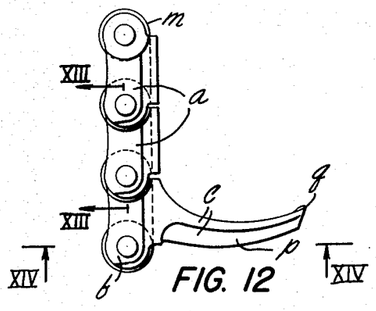
Fig. 12 is a partial view on an enlarged scale of an excavating chain of the machine which is partially shown in Fig. 2 and which is seen on a plane perpendicular to the axes of its articulations.
Figure 13:
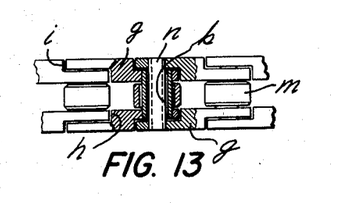
Fig. 13 is a sectional view taken approximately along the line XIII—XIII in Fig. 12.
Figure 14:
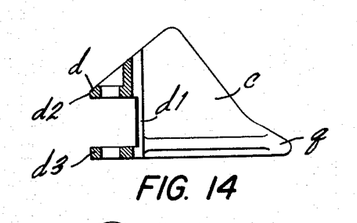
Fig. 14 is a similar view taken approximately along the line XIV—XIV in Fig. 12.
Figure 15:
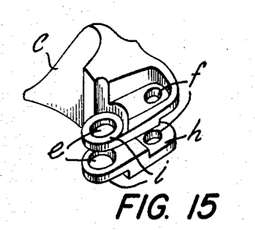
Fig. 15 is a perspective view of one of the links shown in Figs. 12 and 14.
Figure 16:
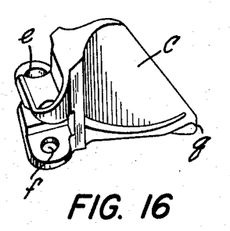
Fig. 16 is another perspective view of the link seen in Fig. 15.

At their upper ends, these guides are connected to the framework 11 by means visible in Figs. 1 and 2. The top part of each of these guides has, projecting on the side facing the inside of the path of the chain, two cheeks of a head serving as one of the two articulations of a short connecting rod 20 which is engaged, for its other articulation, in a head 19a of a member 19 of the framework 11 secured on each of the platforms 18 and 18'. The axes of these articulations are parallel to those of the wheels 7 and 7', and the members 19 rise above the frame 11d so that the guides 14 and 15 bring the middle plane of the sides of the chain which they contain into the middle plane of the toothed wheels 7 and 7' which passes over the swivel joint 12. Figs. 10 and 11 show, for guide 14, the assembly means of the guides 14 and 15 with guide 16. The two ends of the latter are raised, outside the ties of the track, toward the lower ends of the lateral guides 14 and 15. Each of the lower ends of guides 14 and 15 carries under its lower face 14b, 15b (Figs. 3, 4, 10 and 11) an outwardly-extending plate 52 which has a V-shaped notch 52a. Facing this plate, each raised end of the guide 16 carries, against its lower face, a plate 53 which has a beveled notch 54 wherein plate 52 can be fitted between the oblique bottom of notch 54 and the outer face of the guide 16. In order to guide this interengagement union laterally, a wall 53a is provided in the center of the notch 54 to engage in the notch 52a and to force the two guides to place themselves in alignment upon a small movement of the entire machine toward the guide 16. A locking device for the assembled guides is described below.

Figure 6:
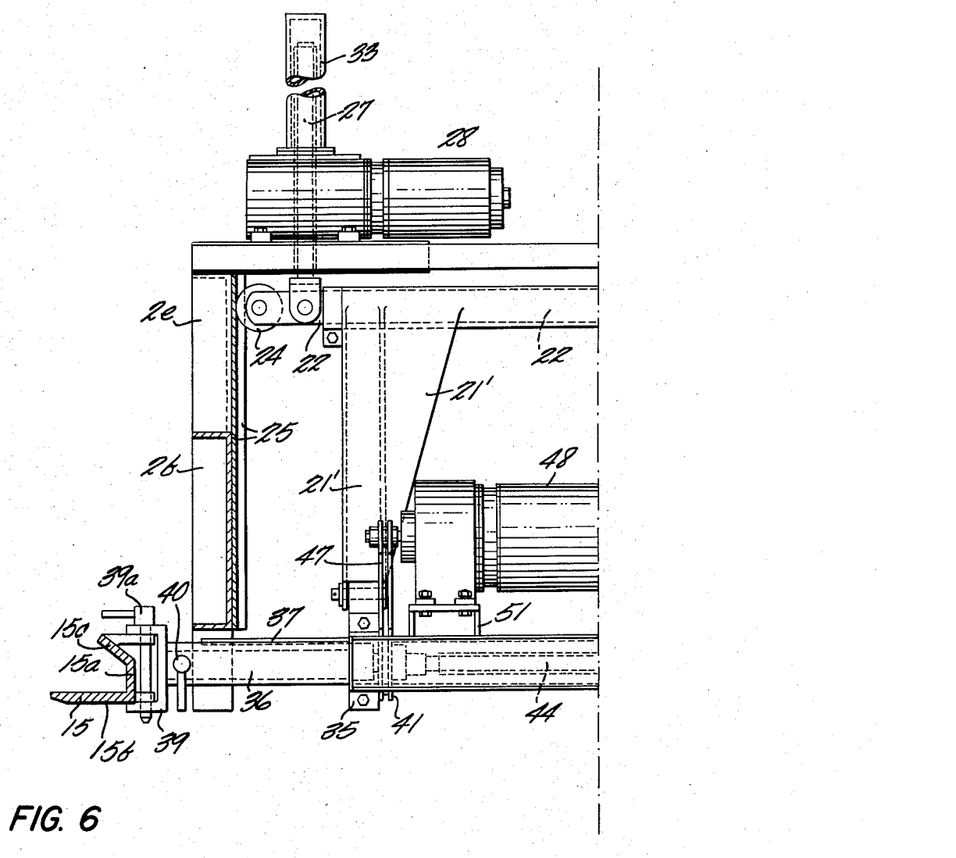
Figs. 6 and 6a provide a sectional view similar to that of Figs. 5 and 5a but showing the parts of the machine in a different position.
Figure 6A:
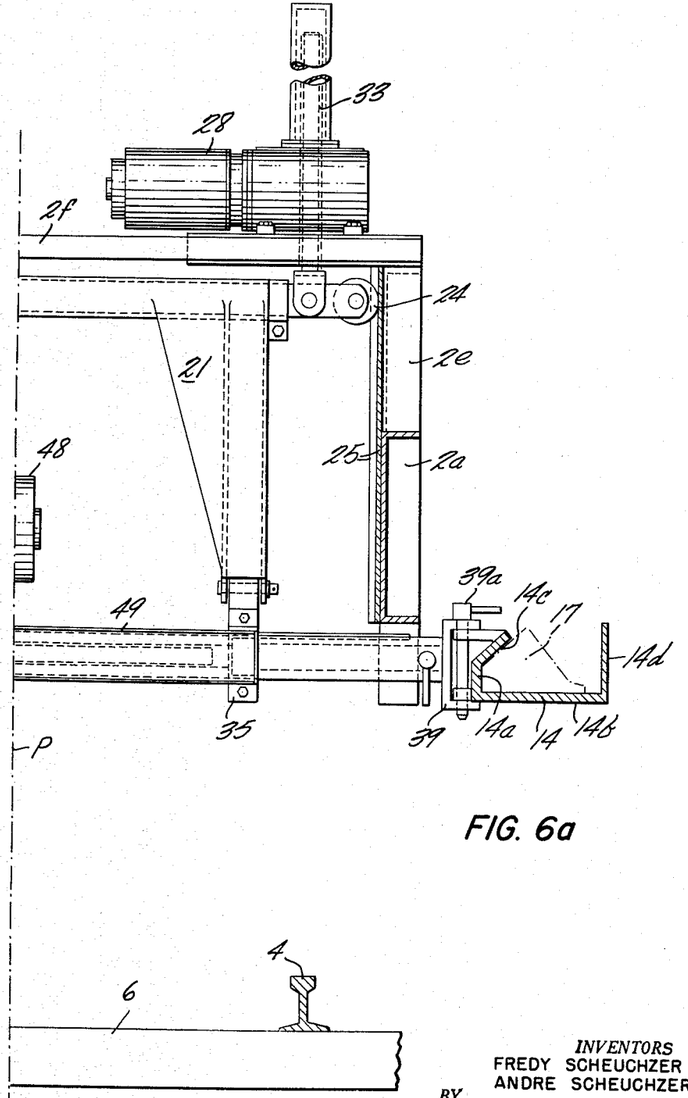
Figure 7:
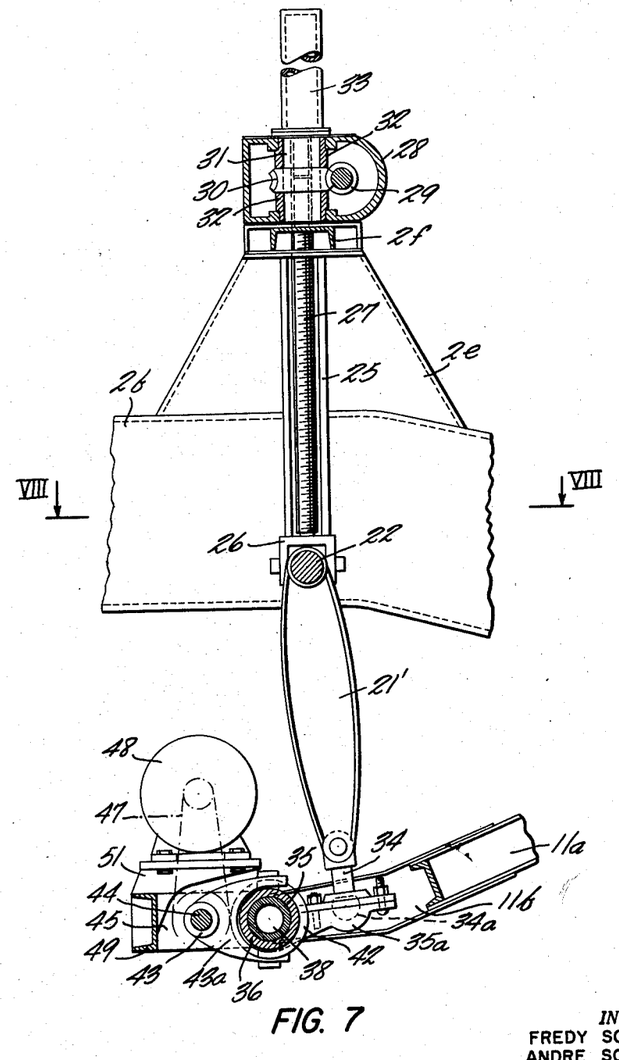
Fig. 7 is a partial vertical sectional view taken approximately along the line VII—VII in Fig. 5.
Figure 8:
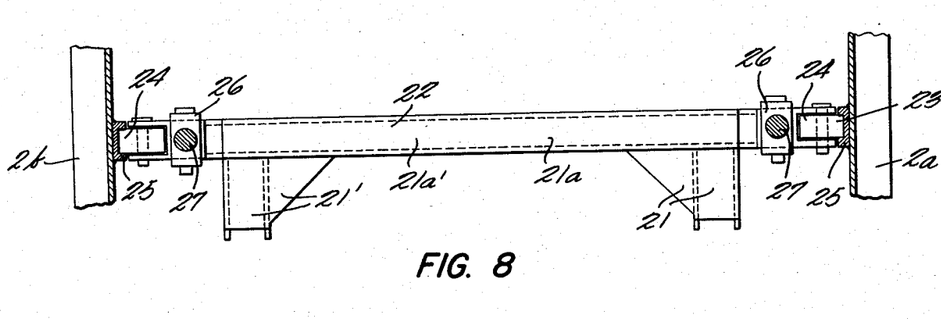
Figure 9:
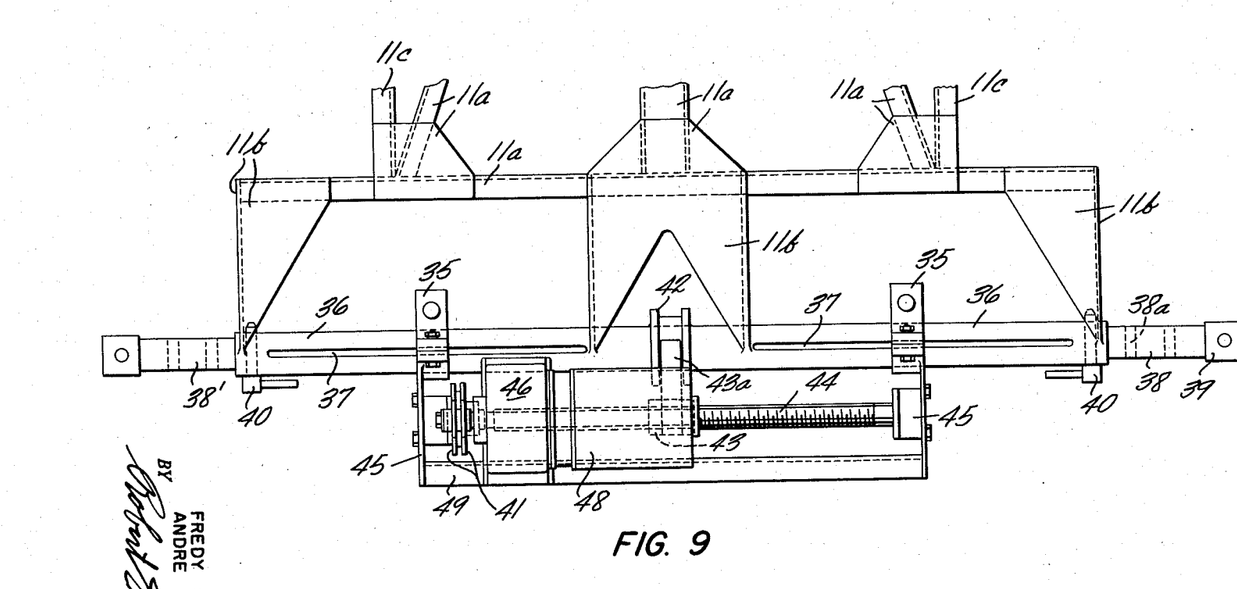
Fig. 9 is a view similar to Fig. 2 but showing on an enlarged scale a portion of the machine as seen in Fig. 2.

The various sides of the guides 14, 15 and 16 can be designated by the same symbols which indicate the sides of the guides 14 and 15 in Figs. 6 and 6a, with the exception that the guide 14 alone has an outer side, 14d, serving to retain the ballast in the ascending path of the chain as far as the notch 14f at the upper end of this guide (Fig. 2) from which the ballast falls on a belt conveyor 9 which sends it to the screening mechanism shown in Fig. 1.

The oblique sides 16c and 14c of the guides shown in Figs. 10 and 11 support respectively a head 55 and a fork 60. A bolt 56 is articulated by one end in the head 55 by means of a pin 58 and carries, on its opposite threaded portion, a nut 59 having a circular groove 59a by which it can be introduced in the fork 60 when it is suitably screwed on the bolt. Locking of the two guides is effected by unscrewing nut 59 until the left flank of the groove 59a abuts and locks against the face of the fork 60.

It will be apparent that the reverse operation of nut 59 followed by the pivoting of the bolt above the guide 16 permits the unlocking of the guides for the purpose of disassembly by withdrawal of guides 14 and 15 so that plate 52 is released from notch 54.

The wheel 7 is mounted on a movable bearing forming part of a tensioning device of known type (not shown). Before the guides can be separated, the chain 5 must be slacked. It then becomes accessible between the separated ends of the guides, so that it can be cut from the two sides of the track by disassembling two of its articulations.

This separation of the chain is made easy by reason of the chain construction described below.

Disassembly of the chain may also be effected before the separation of the guides. For this purpose, an aperture 57 is provided in the joints of the walls 16c and 14c by means of a notch 57a made in the edge of the wall 16a and a notch 57b opposite notch 57a in the edge of the wall 14c (Figs. 10 and 11). A similar aperture 57' is formed in like manner in the opposite walls 14b—16b. These apertures, which are positioned at the joint of the guides 14 and 16, make possible the introduction of a tool for the removal of an articulation pin in the chain. Recessed slightly from each of these apertures, the guide 16 has a threaded hole 61 in which is introduced a screw serving to lock the chain in the guide 16 in order that the portion of the chain contained in this guide after removal of the lateral guides will be held in position.

To bring guide 16 into proper position relative to guides 14 and 15, it is bent at each of its ends in such a way that its wall 16a, perpendicular to the middle plane of the path of the chain and serving as support for the faces of the links turned toward the interior of this path, is cylindrically curved at 62 and there has a radius of curvature large enough to be tangential simultaneously to two rotatable rollers with which the articulations of any one link of the chain are equipped.

Figs. 12 to 16 show the elements of a chain having the above-mentioned features. The links of the chain are of two types having common characteristics, the free links a, and the links b which carry arms or scoops c, serving to loosen and to propel the ballast. These arms are shown at 17 in Fig. 2. Each of the links a and b is double, comprising a rigid head d having cheeks d2 and d3 formed with four apertures defining the two articulation axes of the link. The two aligned apertures e of one end of the link have the same diameter, which is larger than that of the two apertures f of the opposite link end. The thickness of the cheeks d2 and d3 at their median portions g is reduced to half around all of the apertures by means of recesses h cut from the interior of the head around the smaller apertures f and recesses i cut from the exterior of the head around the larger apertures e. The ends of the heads are cylindrically rounded in relation to the axes of the corresponding apertures, and the recesses h and i are sufficiently large that the smaller apertured end of each head will receive the larger-apertured end of the adjacent head, and the axes of the two pairs of apertures will coincide without the rounded edges touching the peripheral surfaces of the recesses. Each articulation comprises a longitudinally split tube k fastened at its two ends in the apertures e and passing freely through the center of a roller m. Tube k in turn is freely traversed by a tubular pin n, the two ends of which are forcibly engaged in the smaller apertures. Pin n is also rendered somewhat flexible by means of a longitudinal slot (not shown).

This construction, which is free from rivets and the like, facilitates disassembly and replacement of parts.

The arm c has, in a plane perpendicular to its path, the general form of a trapezium, a long side of which extends parallel to the lower walls of the guides 14, 15 and 16. At the end of this long side there is a tip q, at the level of which the arm is reinforced in back by a rib p.

Figure 17:
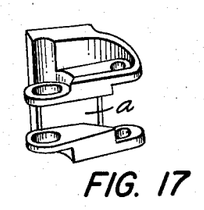
Fig. 17 is a perspective view of another link shown in Fig. 12.
Figure 18:
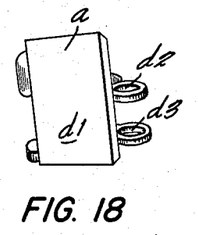
Fig. 18 is another perspective view of the link seen in Fig. 17.

Figs. 17 and 18 show one of the free links which separate the links carrying the arms c.

Figure 19:
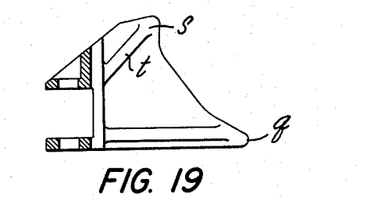
Fig. 19 is an elevational view similar to Fig. 14 of a modified form of the link shown in Figs. 14 and 16.
Figure 20:
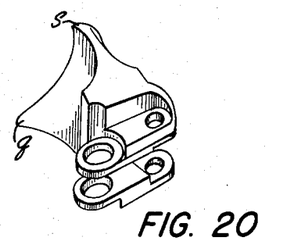
Fig. 20 is a perspective view of the link shown in Fig. 19.
Figure 21:
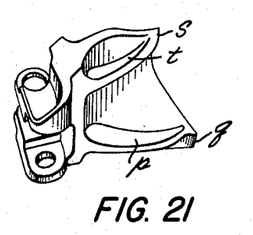
Fig. 21 is another perspective view of the link of Fig. 19.

Figs. 19, 20 and 21 show a modified form of a link with arms having two tips q and s and two ribs p and t. The second tip, instead of being at the end of the edge opposite the first, may be at the center of the vertical height of the arm.

Figure 3:
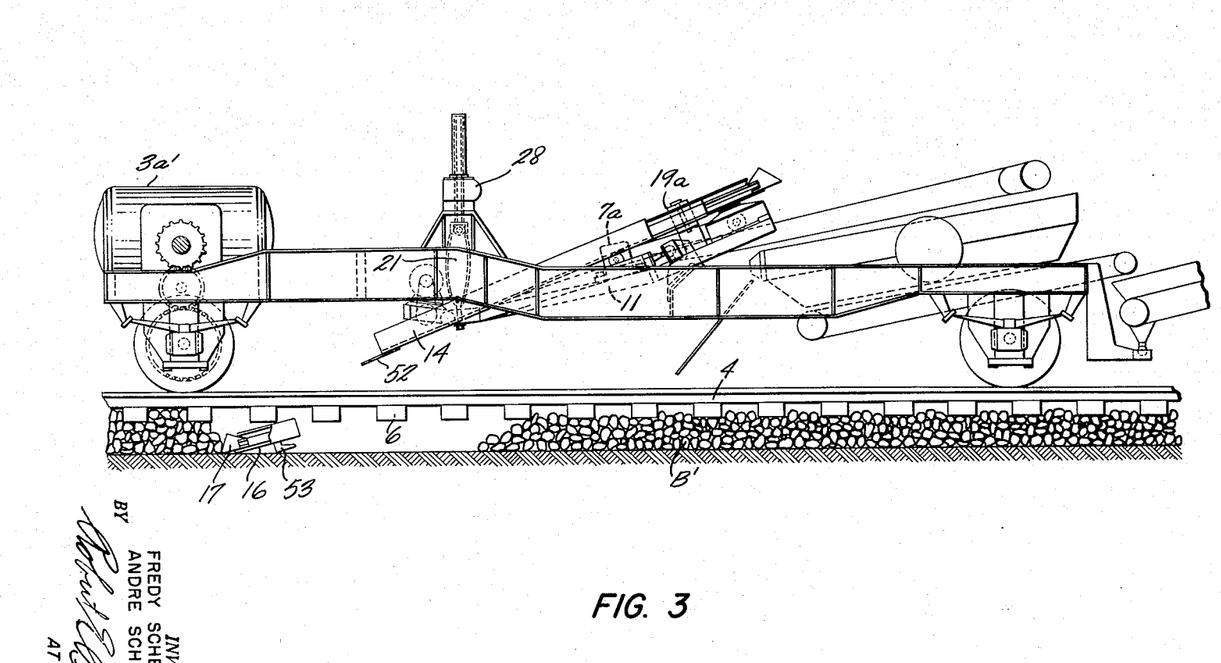
Fig. 3 is a side elevational view similar to Fig. 1 but showing parts of the machine disassembled in a different position.
Figure 4:
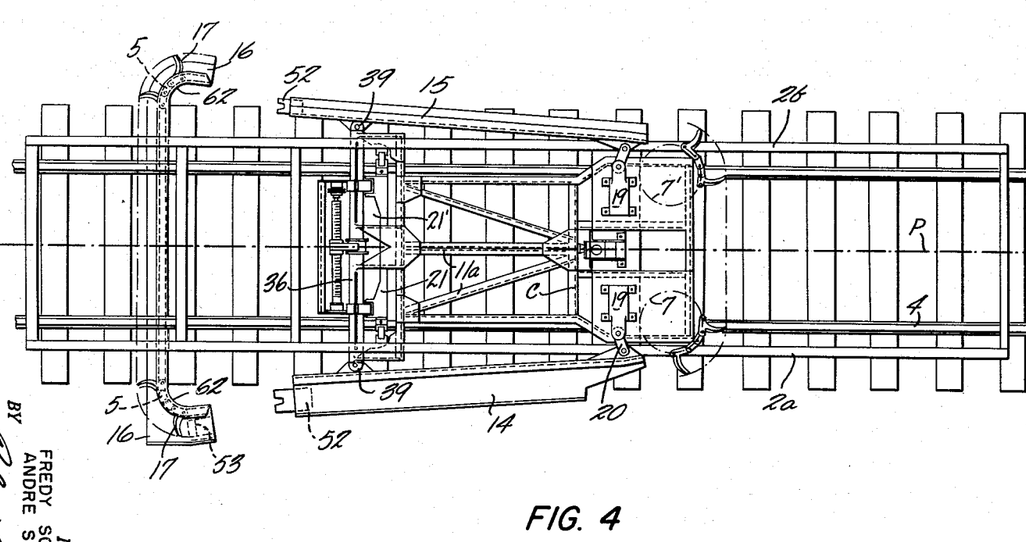
Fig. 4 is a top plan view of the arrangement shown in Fig. 3.
Figure 5:
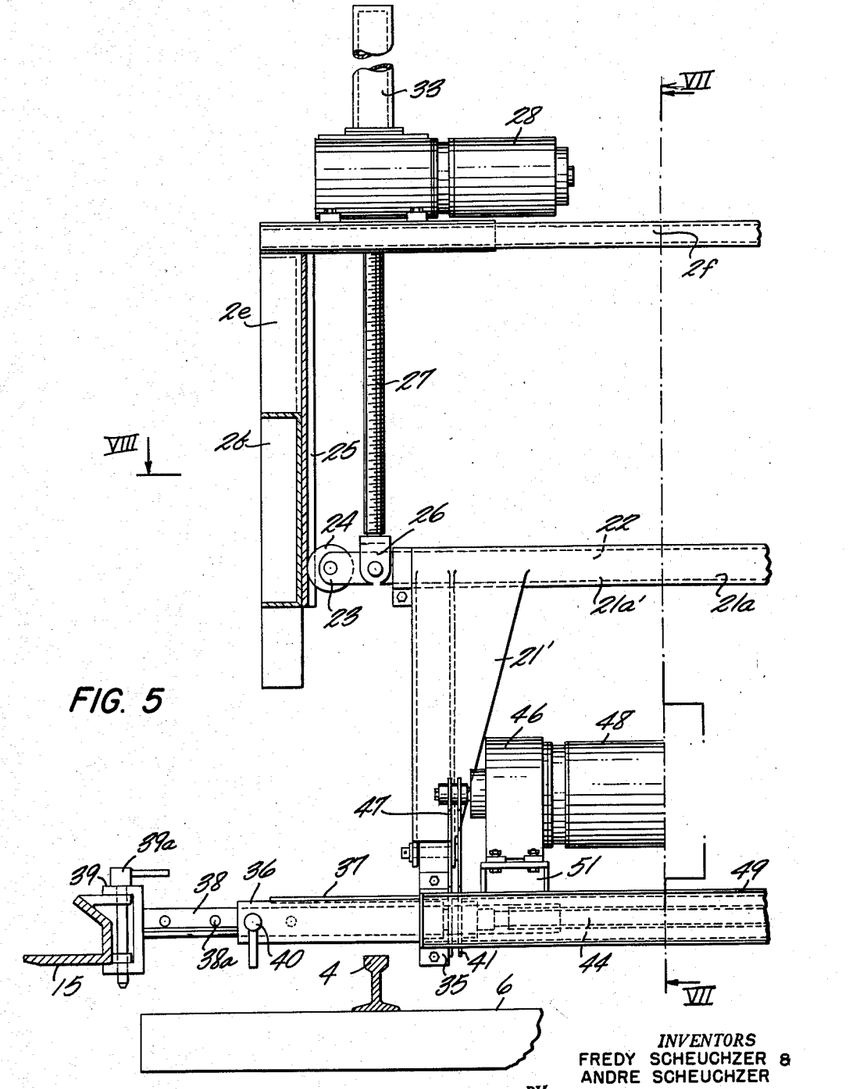
Figs. 5 and 5a provide a sectional view of the machine shown in Figs. 1 to 4 taken approximately along the lines A—B—C and D—E—F on an enlarged scale in Fig. 1.
Figure 5A:
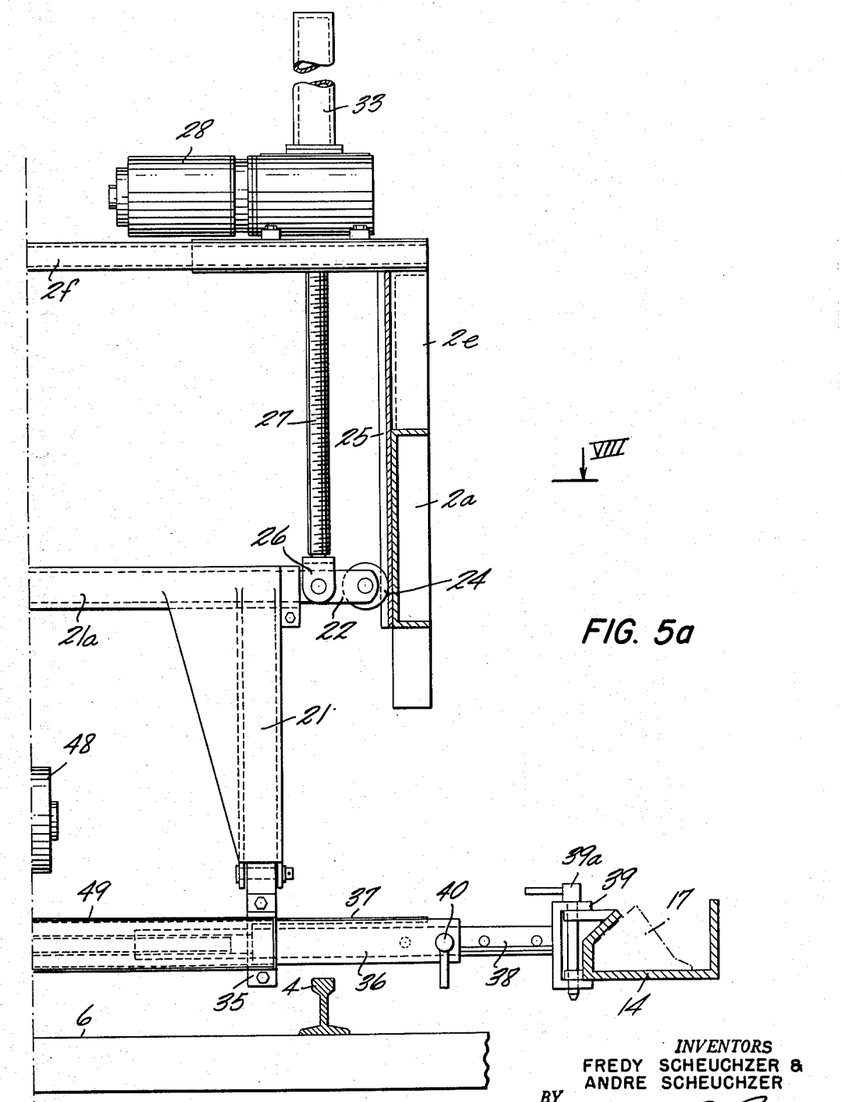

The operation of the machine above described is as follows:

At the location at which work is to begin, the track is cleared of its old ballast over the distance which is to separate the old ballast B from the screened ballast B' so that the guide 16 can be placed on the track roadbed as shown in Fig. 3. The machine, brought along the rails, as from a siding, has its guides 14 and 15 raised, as in Fig. 3, and close to the stringers 2a and 2b, as in Fig. 4. They are set apart by shifting the bars 38 to the outside of tube 36 and by securing them in the position of Fig. 1 by means of pins 40. Then the guides 14 and 15 are lowered by manipulation of the screws 27 to lower the shaft 22 either before or after shaft 22 has been inclined by a suitable angle determined by a difference of the degree of lowering of these two screws. The guide 16, in position with its chain section, can then be coupled to the guides 14 and 15, and the chain section can be coupled to the remainder of the chain. For this purpose, the machine is advanced slowly toward guide 16, the two ends of which are held at the height required for the fitting of plates 52 in notches 54. Locking is effected by means of the bolts 56, and the ends of chain 5 are joined together by passing the pins n through the openings 57. Finally, the screws are removed from the threaded holes 61.

Claim 5 is set in motion by effecting counter-clockwise rotation of wheel 7 as seen in Fig. 2, guide 14 being the one in which the ballast is elevated. The chain 5 rotates the guide wheel 7', and bears with its rotatable rollers m against the lower elbows 62 of the inner wall of the guide 16, as well as against the straight portion of this wall which reacts to the thrust of the arms resulting from the resistance of the ballast to the advance of the machine. The machine is given a forward speed along the rails of the order of 164 to 656 meters per hour, depending on the nature of the ballast. The ballast pushed aside along guide 16 enters guide 14, wherein it is elevated to the notch 14f, from which it falls on the conveyor 9 which carries it to the screening mechanism.

After screening, the ballast B' falls back on the track as shown.

When this operation is completed or must be interrupted for some reason, such as the passage of a train, guides 14 and 15 are disconnected from guide 16 and the corresponding chain section, as described above. Guides 14 and 15 are raised by the screws 27, bringing them against the stringers 2a and 2b as in Fig. 4, by displacement of the bars 38 relatively to the pins 40. The machine is thus brought to a width smaller than the gauge of the track, so that it can be moved onto a siding if it must make room for a train or allow a train to pass on the adjacent track.

In the course of the work it may be necessary to move the guide 16 from one side to the other to avoid certain obstacles along the track. This is done by controlling the motor 48 of the screw 44 to propel the nut 43 which drives the tube 36, which supports the guide 16 by means of the guides 14 and 15.

This is possible regardless of the depth at which the arms 17 are working under the ties. This operation is due to the mobility of the framework around the center of the swivel joint, since the neck of the swivel joint is, by definition of the latter, of smaller diameter than the orifice of the bearing. This also makes possible the elevation of the framework from the bottom as shown in Fig. 3. This mobility further permits rotation of the framework around an axis of variable direction when the shaft 22 is inclined, the axis being that of the neck of the swivel joint if equal and opposite speeds are simultaneously given to the two screws 27, but it may have all directions comprised between straight lines passing through the center of the swivel joint and through either of the two lower points of suspension of the framework if the screws 27 are not actuated simultaneously at equal and opposite speeds. All these directions may, moreover, vary as to their slopes in the vertical planes which they contain, and to the extent that the working depth of the chain 5 may vary.

The suspension of the frame 49 and of the framework by the connecting rods 21 is necessary to permit the rotation of the framework around a horizontal and transverse axis passing through the swivel joint, because the bearing of the latter is fixed. But this bearing may be mounted in a longitudinal slide extending backward to permit this rotation, while the connecting rods 21, 21' would be omitted and screws similar to the screws 27 would be articulated directly on parts such as parts 34.

The assembly by means of the swivel joint 12 may be replaced by a Cardan joint, with the framework 11 corresponding to one of the two shafts and the other shaft would be movable in a bearing having an axis in the plane P and directed along the central slope of the frame 11a.

The articulations 39 may be replaced by unions employing curvatures of the tube 36 and bars 38 having the swivel joint as a center. In this case, each of the guides 14 and 15 could have its upper end conencted to the framework 11 by a simple articulation, without the connecting rods 20.

Whether the tube or bar slide, such as the bars 38, is straight or curved, the means for shifting it from one side to the other may differ from the means described. Not only could the two relative movements of the screw 44 and of its nut be replaced by two absolute movements of the nut alone, but both these members could be replaced by a toothed unit, comprising, for example, a rack or a toothed sector integral with the framework or the suspended frame and a pinion mounted with a motor on the other or these two rigid units, viz. the framework and frame, means being provided so that the various positions given to the framework are stable. For example, the control pinion may be a screw tangential to the rack or to the toothed sector.

Each of the connecting rods 21 and 21' may be connected to the frame 49 by a swivel joint and its bearing.

The screws 27 may be replaced by racks meshing with wheels driven by tangential screws.

Between the wheels 7 and 7', the chain 5 may be held by a horizontal bar situated at the same distance from the axes of articulation as the center of gravity from the arm-carrying links.

It will be understood that various changes and modifications in addition to those indicated above may be made in the embodiments herein described and shown in the drawings without departing from the scope of the invention as defined in the appended claims. It is intended, therefore, that all matter contained in the foregoing description and in the drawings shall be interpreted as illustrative only and not as limitative of the invention.

What we claim and desire to secure by Letters Patent is:

1. A machine for clearing railroad tracks of their ballast, comprising a frame in the form of a complex beam mounted on front and rear wheels for movement over the tracks being cleared of ballast, a plurality of rigid guides and sprocket wheels defining a polygonal path a section of which is adapted to pass under the ties of the track and two lateral sections of which extend upwardly on either side of said frame, an excavating chain carried in said path in engagement with said wheels, and driving and transmission means for moving said chain, said guides including a lower guide and guides forming the lateral sections of said path, the latter guides being mounted entirely in the space comprised between the axles of the front and rear wheels and extending obliquely back to the point above said beam, a framework supporting said guides and wheels and being supported by means mounting the upper portion of said framework on said beam and giving said framework at least all the degrees of free movement provided by a swivel joint, a frame supporting said framework at its lower end, said frame being suspended from the beam by means including two supporting members which are spaced apart in the direction transverse to the track and are displaceable in height independently of one another to vary the lateral inclination of said lower guide, the lower end of said movable framework and said frame being connected by means permitting their relative displacement with respect to each other in a direction transverse to the track, and each of the lateral guides being mounted on the movable framework by means of at least one lateral articulation at its upper end, the axis of said articulation being parallel to the axes of the sprocket wheels.

2. A machine as defined in claim 1, further comprising a motor and transmission means moved by said motor for effecting the relative displacement of said frame and the lower end of said movable framework.

3. A machine as defined in claim 1, wherein said beam comprises two laterally-spaced stringers and wherein the movable framework carrying the guides of the chain is mounted at its top in the center of a crosspiece of the beam, and has a first portion which extends obliquely downward between the two stringers of the beam, a second portion larger than the first portion positioned below the top of the beam, and a third portion which extends obliquely upward above the beam.

4. A machine as defined in claim 3, wherein said movable framework is mounted on the beam by an articulation comprising a swivel joint, one element of said swivel joint being integral with said framework and the other element of said swivel joint being integral with said crosspiece of the beam.

5. A machine as defined in claim 3, further comprising two members supporting the lower portions of the lateral guides of the chain, said members being mounted at the bottom of the framework and being adapted to occupy fixedly a plurality of positions in relation thereto, in said plurality of positions the outer ends of said members being at different distances from the lower edges of the framework, one of said distances being such that the lower ends of the lateral guides can be assembled with the raised ends of said lower guide when it is passed under the track and another of said positions permitting the lateral guides, when disconnected from the lower guide, to be moved toward one another by rotation about their upper points of articulation.

6. A machine as defined in claim 4, further comprising connecting rods supporting the frame, said connecting rods having axes transverse to the track and being connected to said supporting members, said members comprising vertical control screws mounted in nuts carried by casings integral with a cross-piece of the beam, said casings axially restraining the nuts, wheels integral with said nuts and transmission means connecting each wheel to a motor, whereby to permit rotation of said wheels independently in two directions to vary the positions of said screws in said nuts.

7. A machine as defined in claim 6, wherein said screws support said connecting rods by means of a shaft transverse to said beam, vertical sides carried by the stringers of said beam, and the ends of said shaft being engaged in said slides, and said screws being articulated to said shaft, whereby said shaft is movable about an axis parallel to the stringers.

8. A machine as defined in claim 3, wherein the framework is formed from bars which form distinct frames in different planes and having different widths, said frames being connected at least on one side which is common to said frames along a portion of their lengths and having a direction which is perpendicular to the longitudinal plane of symmetry of the beam in the median position of the framework relative to the beam.

9. A machine as defined in claim 8, wherein one of said frames has the form of an isosceles triangle and is connected to said beam at its vertex, a portion of said frame extending between the stringers of the beams to a point below said stringers, said portion of said frame extending when the framework is in its median position to a point outside the projection of each stringer perpendicular to the plane of the rails, said prolonged portion forming one of the longer sides of a rectangular frame, the shorter sides of said last-named frame being perpendicular to the longer sides and directed forwardly, the lower prolonged side of the triangular frame also forming one side of a second rectangular frame which is disposed between the two stringers of the beam and has two lateral sides which define a plane which forms an acute angle with the plane of the triangular frame, a bar connecting the upper ends of said lateral sides, said bar being fastened to the vertex of the triangular frame, and the two sides of said bar extending from said vertex forming an obtuse angle.

10. A machine as defined in claim 2, wherein the frame suspended from the beam comprises a three-sided chassis, two sides of said chassis being parallel to the direction of the track and said means for effecting the relative displacement of the frame and the lower end of the movable framework including a screw supported at its two ends between said sides and a nut carried by said screw, said nut being confined by surfaces integral with the framework, said screw being rotatable to effect movement of the nut axially thereof.

11. A machine as defined in claim 10, wherein said screw carries a toothed wheel, a motor mounted on the frame, and transmission means between said motor and said toothed wheel for rotating said screw.

12. A machine as defined in claim 10, wherein said nut is provided with a forked extension and the surfaces integral with the framework define a circular groove in which said forked extension is received, engagement of said forked extension in said groove preventing rotation of said nut.

13. A machine as defined in claim 10, wherein the lowermost side of the lower frame of the movable framework comprises a tube having at its center ring members defining a circular groove, said tube being formed with longitudinal keys, two collars mounted on said tube and having grooves engaged by said keys, said collars being integral with the suspended chassis, bars disposed interiorly of said tube, each bar being provided with means for supporting at variable distances from the ends of said tube the lower point of attachment to the framework of one of the lateral guides for the chain.

14. A machine as defined in claim 7, wherein said suspended frame is connected to the lower ends of the connecting rods by means of an articulated unit providing a connection from each of said connecting rods to a single point of said frame, whereby said frame may rotate through the same angles as the framework.

15. A machine as defined in claim 1, wherein the path of the excavation chain has the general configuration of a four-sided figure, the upper side of which is comprised between two of said sprocket wheels, and the lower guide forming the lower path of the chain has its two ends rearwardly curved toward the two lateral guides in such manner that at least one of its walls is perpendicular to the plane of the path and is cylindrically curved, said walls serving as supports for the faces of the links of the chain turned toward the inside of said path and said links being provided at their points of articulation with rolls rollable against the walls of the guides.

16. A machine as defined in claim 15, wherein the lower ends of the lateral guides and the raised ends of the lower guide are provided with complementary interengaging means, and locking means for maintaining said interengaging means in fixed position with the end faces of the walls of the guides juxtaposed in colinear relationship.

17. A machine as defined in claim 13, wherein the lateral guides of the chain have their lower ends connected to the movable framework by means of articulations, said articulations being connected to the bars displaceable in said tube.

18. A machine as defined in claim 17, wherein the rear side of each lateral guide has projecting toward the inside of the path two cheeks forming part of said articulation.

References Cited in the file of this patent

UNITED STATES PATENTS

| 1,557,908 | Ursino | Oct. 20, 1925 |
| 2,004,051 | Lemaire | June 4, 1935 |
| 2,254,742 | Humphrey | Sept. 2, 1941 |
| 2,505,501 | Miller et al. | Apr. 25, 1950 |

FOREIGN PATENTS

| 417,745 | Great Britain | Oct. 11, 1934 |